(12) United States Patent
Niikura

(10) Patent No.: US 6,616,230 B2
(45) Date of Patent: Sep. 9, 2003

(54) SLIDABLE VEHICLE SEAT ASSEMBLY

(75) Inventor: Naoki Niikura, Ayase (JP)

(73) Assignee: Johnson Controls Automotive Systems Corporation, Ayase (JP)

( * ) Notice: Subject to any disclaimer, the term of this patent is extended or adjusted under 35 U.S.C. 154(b) by 0 days.

(21) Appl. No.: 10/053,117

(22) Filed: Jan. 18, 2002

(65) Prior Publication Data

US 2002/0101104 A1 Aug. 1, 2002

(30) Foreign Application Priority Data

Jan. 31, 2001 (JP) .................................. 2001-024138

(51) Int. Cl.[7] ................................................ B60N 2/00
(52) U.S. Cl. .................... 297/311; 297/344.11; 248/429
(58) Field of Search ........................ 297/344.1, 344.11, 297/311; 248/429, 430, 287.1

(56) References Cited

U.S. PATENT DOCUMENTS

| | | | | |
|---|---|---|---|---|
| 1,718,042 A | * | 6/1929 | Hamsing .................... | 248/393 |
| 2,959,210 A | * | 11/1960 | Peralstine ................. | 297/344.1 |
| 4,781,353 A | * | 11/1988 | Nishino ..................... | 248/395 |
| 5,718,478 A | * | 2/1998 | Allison ..................... | 297/344.1 |
| 6,145,941 A | * | 11/2000 | Anderton et al. .......... | 305/100 |
| 6,371,431 B1 | * | 4/2002 | Schmidt et al. ............ | 248/419 |
| 6,435,590 B2 | * | 8/2002 | Miyahara et al. ......... | 296/65.11 |

FOREIGN PATENT DOCUMENTS

| | | |
|---|---|---|
| BE | 899282 | 7/1984 |
| EP | 0331241 | 9/1989 |
| GB | 1031434 | 6/1966 |

OTHER PUBLICATIONS

European Search Report dated May 7, 2002.

* cited by examiner

Primary Examiner—Peter M. Cuomo
Assistant Examiner—Stephanie Harris
(74) Attorney, Agent, or Firm—Foley & Lardner

(57) ABSTRACT

A vehicle seat assembly is provided with a seat frame supporting a seat cushion, a pair of lateral slide units longitudinally spaced to each other and coupled to the seat frame for lateral sliding movement of the seat cushion, and a pair of longitudinal slide units laterally spaced to each other and adapted to be fixedly secured to a floor panel of a vehicle body for longitudinal sliding movement of the seat cushion. The lateral slide units is coupled to the longitudinal slide units. Also, the lateral slide units include front and rear stationary rails, which are longitudinally spaced to each other and supported with the longitudinal slide units, and front and rear movable rails, which are longitudinally spaced to each other and held in engagement with the stationary rails for the lateral sliding movement of the seat cushion, respectively, and the front and rear movable rails of the lateral slide units form a part of the seat frame.

7 Claims, 3 Drawing Sheets

SLIDABLE VEHICLE SEAT ASSEMBLY

BACKGROUND OF THE INVENTION

The present invention relates to vehicle seat assemblies and, more particularly, to a vehicle seat assembly having a pair of longitudinal slide units for sliding movement in a longitudinal direction and a pair of lateral slide units for sliding movement in a lateral direction.

In general, a vehicle seat assembly is constructed of a seat body composed of a seat cushion and a seat back standing upright at a rear end of the seat cushion for adjustable rotating movement in a longitudinal direction (fore and aft direction). The seat cushion, which forms a part of the seat body, is supported on a floor panel of a vehicle body through a pair of longitudinal slide units (fore and aft slide units). Thus, the seat body is enabled to move at adjusted positions in the fore and aft direction of the vehicle body, thereby enabling various modifications in a layout of the vehicle seat assembly in a vehicle compartment.

With such a pair of fore and aft slide units of the vehicle seat assembly, it has been a usual practice for the units to be constructed of a pair of longitudinally spaced lower rails fixedly secured to the floor panel of the vehicle body, and a pair of upper rails fixedly secured to the seat body. As seen in FIGS. 3A and 3B, a pair of longitudinally spaced, front and rear lateral slide units 1 are fixedly located on the floor panel 4 of the vehicle body. Each of the lateral slide units 1 includes a stationary rail 3 fixed to the floor panel 4 and a movable rail 5 held in sliding engagement with the same. Both distal ends of the front and rear movable rails 5 of the lateral slide units 1 are connected to laterally spaced lower rails 8 of a pair of laterally spaced fore and aft slide units 7. The pair of laterally spaced lower rails 8 carry a pair of laterally spaced upper rails 9 to guide the same for sliding movement in the fore and fore direction, with a seat frame 10 of the seat cushion being carried by brackets 9a secured to the upper rails 9.

SUMMARY OF THE INVENTION

However, the presence of the lateral slide units 1 and the fore and aft slide units 7 used for such a vehicle seat assembly needs the lateral slide units 1, below the fore and aft slide units 7, which are laterally elongated. As a result, the seat cushion has an excessively increased height and such a structure needs an increased occupying area of the floor panel 4 of the vehicle body, with a resultant increased restriction of a usable area of the floor panel 4 of the vehicle body. Further, when increasing the amount of sliding movement in the fore and aft direction, an adverse affect appears in that the lateral slide units 1 are exposed below the seat cushion. Also, the vehicle seat assembly is inevitably increased in weight, providing a difficulty in obtaining a structure with a low manufacturing cost.

The present invention has been made with the above view and has an object to provide a vehicle seat assembly which has a lowered height of a seat cushion, which has a reduced occupying area of a floor panel of a vehicle body, which effectively precludes lateral slide units from being exposed below the seat cushion, which enables easy installation of the lateral slide units even in a case where the floor panel of the vehicle body has stepped areas due to wheel houses or the like, which is low in weight and which is low at manufacturing cost.

According to one aspect of the present invention, there is provided a vehicle seat assembly which comprises: a seat frame supporting a seat cushion; a pair of lateral slide units longitudinally spaced to each other and coupled to the seat frame for lateral sliding movement of the seat cushion; and a pair of longitudinal slide units laterally spaced to each other and adapted to be fixedly secured to a floor panel of a vehicle body for longitudinal sliding movement of the seat cushion. The lateral slide units is coupled to the longitudinal slide units. Also, the lateral slide units include front and rear stationary rails, which are longitudinally spaced to each other and supported with the longitudinal slide units, and front and rear movable rails, which are longitudinally spaced to each other and held in engagement with the stationary rails for the lateral sliding movement of the seat cushion, respectively, and the front and rear movable rails of the lateral slide units form a part of the seat frame.

Other and further features, advantages, and benefits of the present invention will become more apparent from the following description taken in conjunction with the following drawings.

DETAILED DESCRIPTION OF THE PREFERRED EMBODIMENT

Figure 1:
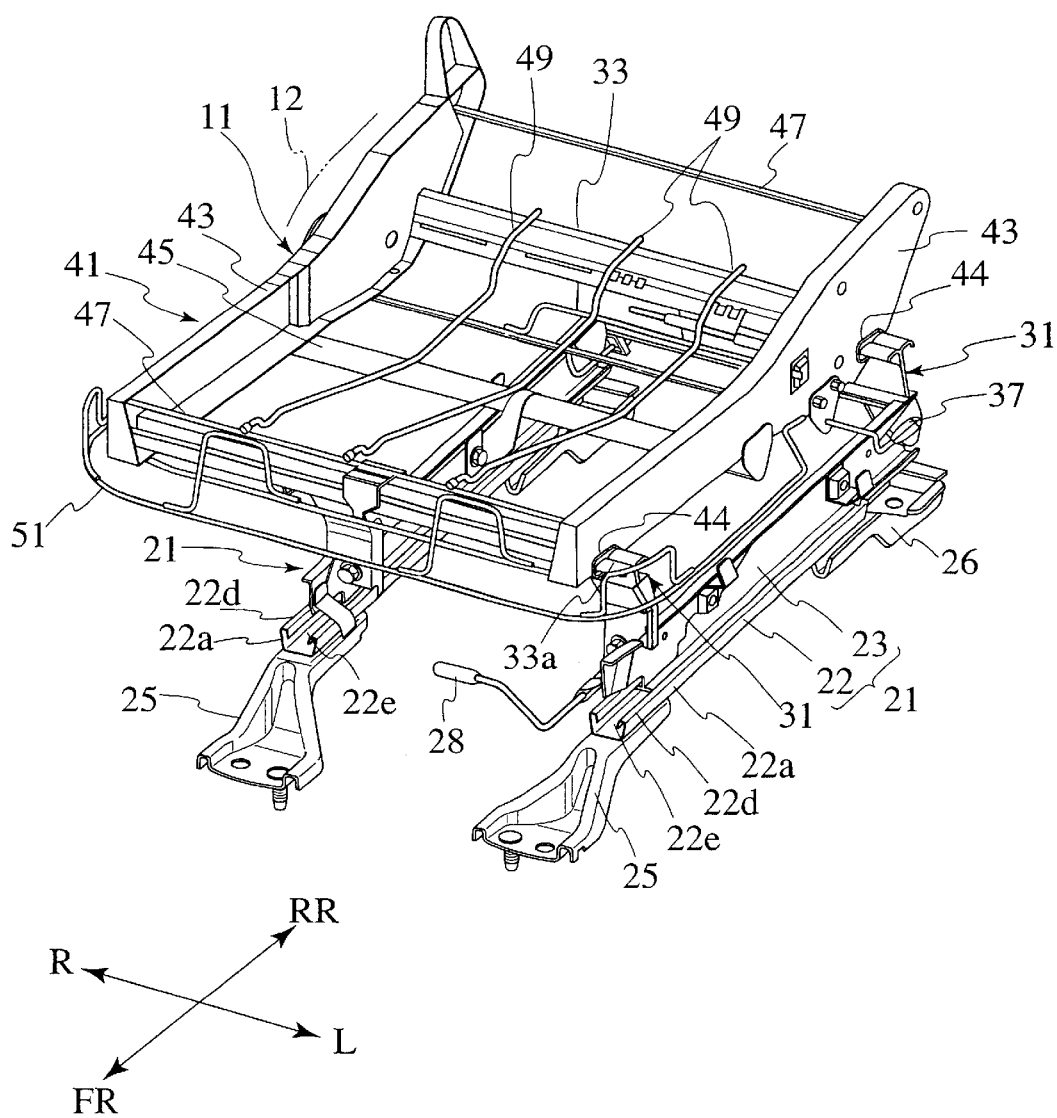
FIG. 1 is a perspective view illustrating a frame structure of a seat cushion of a vehicle seat assembly of an embodiment according to the present invention.
Figure 2:
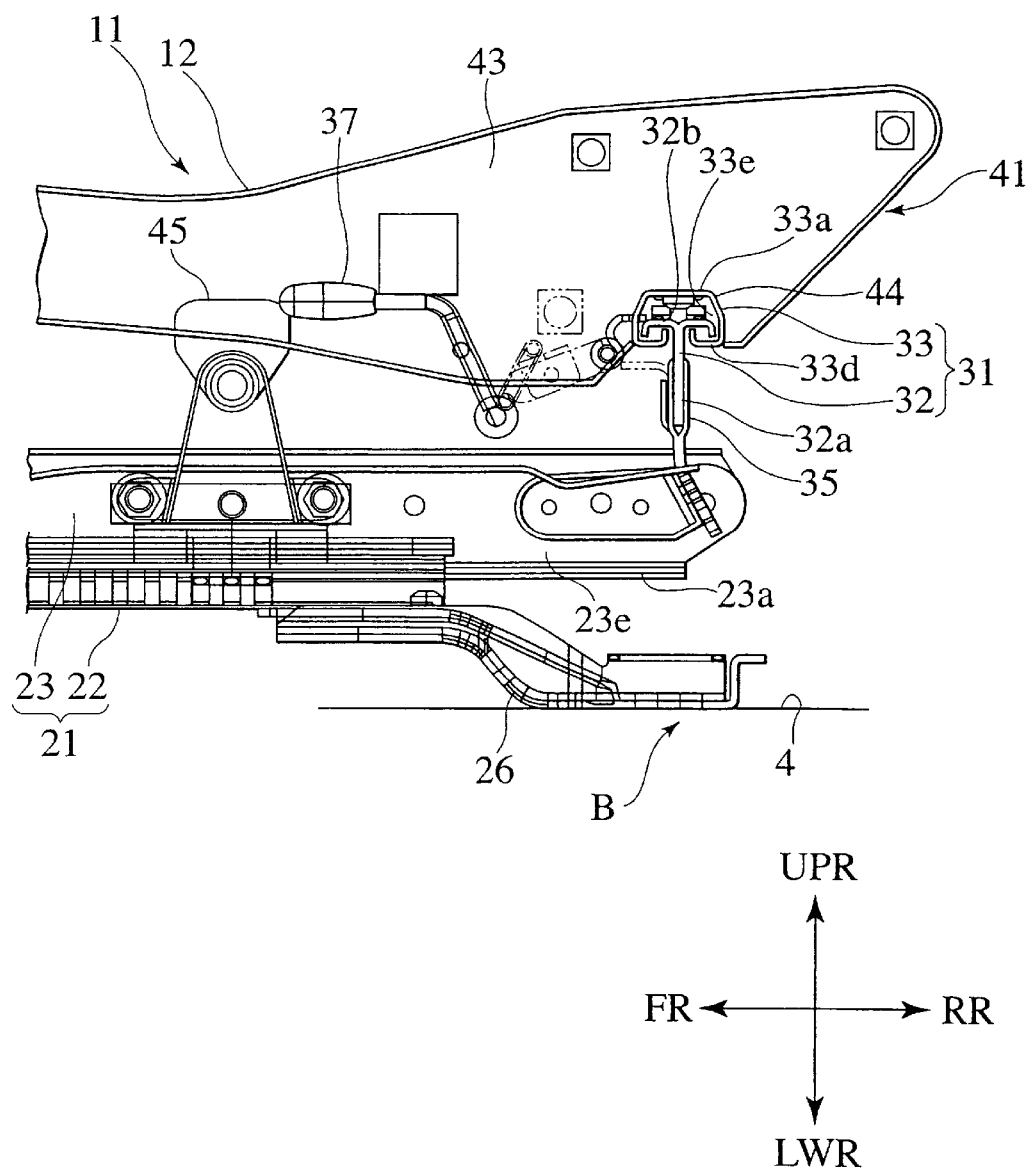
FIG. 2 is a side view of a part of the seat frame structure of the seat cushion of the vehicle seat assembly shown in FIG. 1.
Figure 3A:
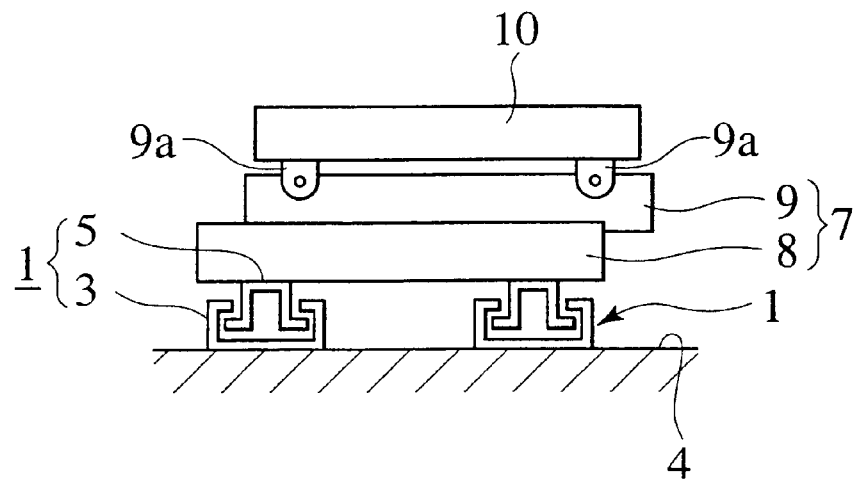
FIG. 3A is a side view of illustrating fore and aft slide units and lateral slide units of a related art vehicle seat assembly.
Figure 3B:
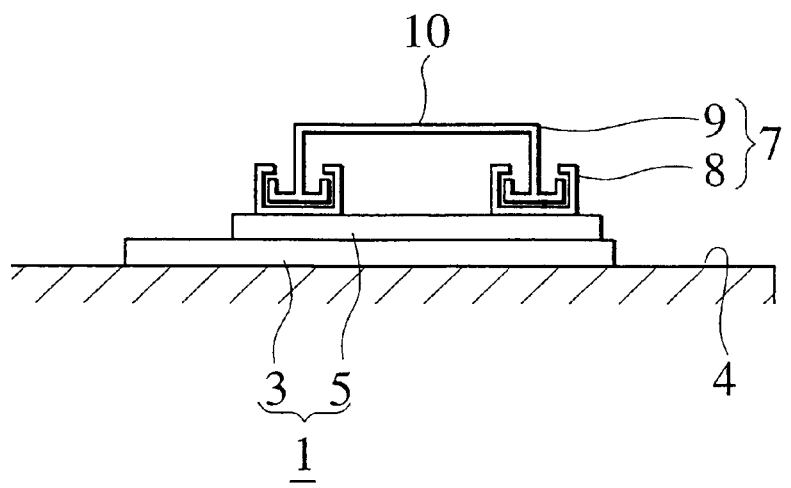
FIG. 3B is a front view of the vehicle seat assembly shown in FIG. 3A.

To describe the present invention more in detail, a vehicle seat assembly of an embodiment of the present invention will be explained below with reference to the drawings wherein FIGS. 1 and 2 show a structure of the vehicle seat assembly of the embodiment. In particular, FIG. 1 shows a perspective view illustrating a seat frame structure, a pair of laterally spaced fore and aft slide units and a pair of longitudinally spaced front and rear lateral slide units which form essential parts of the vehicle seat assembly of the embodiment of the present invention, and FIG. 2 shows a side view partially illustrating the above component parts, wherein symbols FR, RR, L, R, UPR and LWR refer to "forward", "rearward", "left", "right", "upper" and "lower" of a vehicle body B, respectively.

Referring to FIGS. 1 and 2, the vehicle seat assembly, which is generally designated at 11, is constructed of a seat cushion 12 and a seat back which is not shown. A pair of laterally spaced longitudinal slide units (fore and aft slide units) 21, 21 and a pair of longitudinally spaced front and rear lateral slide units 31, 31 are interposed between the seat cushion and a floor panel 4 of the vehicle body for sliding movement of the seat cushion 12 and the seat back of the vehicle seat assembly 11 both in a longitudinal direction (fore and aft direction) and in a lateral direction. Also, for example, when operating the lateral slide units 31, 31, a center seat (not shown) is detachably moved or moved in the fore and aft direction to ensure a space in a lateral direction.

Each of the fore and aft slide units 21, 21 includes a lower rail 22, extending in the fore and aft direction, which is fixedly secured to the floor panel 4 of the vehicle body, and an upper rail 23 which is supported on and guided by the lower rail 22 for sliding movement in the fore and aft direction. The provision of the fore and aft slide units 21, 21 fixedly secured to the floor panel 4 of the vehicle body enables the vehicle seat assembly 11 with the lateral slide units 31, 31 to be mounted to the existing floor panel 4.

Each of the fore and aft slide units 21, 21 is constructed of components parts which are formed by an extrusion process or die casting process of light alloy such as aluminum alloy or magnesium alloy. The lower rail 22 has a front leg 25 and a rear leg 26, which may be dispensed with if desired so as to allow the lower rail 22 to be directly mounted onto the floor panel 4.

The lower rail 22 of each of the fore and aft slide units 21, 21 is composed of a substantially upwardly facing C-channeled body portion 22a, and a pair of upper side wall portions 22d, 22d which are bent inward from distal upper ends of upright side walls of the body portion 22a to form an opening portion 22e.

The upper rail 23 of each of the fore and aft slide units 21, 21 is composed of a body portion 23a, which is assembled to the lower rail 22, and an upright vertical wall 23e, which protrudes upwardly at a center of the body portion 23a and extends upwardly from the body portion 23a away from the opening portion 22e of the lower rail 22.

As shown in FIG. 1, the fore and aft slide units 21, 21 are fixedly retained at a longitudinally adjusted position by means of a lock mechanism, whose lock condition is released by manipulation of an operating lever 28. Also, the pair of longitudinally spaced front and rear lateral slide units 31, 31 are connected to the pair of the upper rails 23, 23 of the fore and aft slide units 21, 21.

The pair of longitudinally spaced front and rear lateral slide units 31, 31 may have different heights. The pair of front and rear lateral slide units 31, 31 include longitudinally spaced front and rear stationary rails 32, 32 and longitudinally spaced front and rear movable rails 33, 33 which engage with the front and rear stationary rails 32, 32, respectively, for laterally sliding movement of the seat frame 41 of the seat cushion.

As viewed in FIG. 2, in consideration of the laterally sliding movement with the compact structure or the like, at least the rear stationary rail 32 of the rear lateral slide unit 31 has a substantially T-shaped cross sectional configuration, a vertical portion 32a of which is fixedly secured to the vertical walls 23e, 23e of the upper rails 23, 23 of the fore and aft slide units 21, 21 by means of a bracket 35. Further, at least the rear movable rail 33 includes a substantially C-channeled, downwardly facing body portion 33a, and a pair of lower end portions 33d, 33d which extends inward from lower distal ends of side portions of the body portion 33a to form an opening portion 33e for enabling lateral movement of the T-shaped configuration of the stationary rail 32. Also, the front stationary rail 32 and the front movable rail 33 of the front lateral slide unit 31 have the same structure as that of the rear stationary rail 32 and the rear movable rail 33 of the rear lateral slide unit 31. And incidentally, the present invention is not limited to a particular structure of the substantially T-shaped configuration of the stationary rail 32, if equivalent operation can be performed.

The T-shaped stationary rail 32 has its upper distal ends respectively formed with horizontal portions 32b, 32b with which the body portion 33a of the movable rail 33 is held in mating engagement for the lateral sliding movement through the opening portion 33e. Adjusting the length of the vertical portion 32a of the stationary rail 32 enables the heights of the front and rear lateral slide units 31, 31 to be different from one another. Further, a lateral lock position of at least one of the front and rear lateral slide units 31, 31 may be effectuated by means of at least one lock mechanism, whose lock condition is released by manipulating an operating lever 37.

According to an important feature of the present embodiment, the respective movable rails 33, 33 of the front and rear lateral slide units 31, 31 form front and rear frame components which are fixedly secured to front and rear distal ends of laterally spaced side frame components 43, 43 of the seat cushion 12. That is, a seat frame 41 of the seat cushion 12 is constructed of the pair of front and rear movable rails 33, 33, which serve as the front and rear frame components, and the pair of laterally spaced side frame components 43, 43 which are formed in panel shapes and secured to the front and rear movable rails 33, 33. Each of the side frame components 43, 43 is formed at its front and rear area with downwardly facing concave portions 44, 44 with which the body portions 33a, 33a of the movable rails 33, 33 mate to be fixedly secured by a welding or a deposition. Further, the side frame components 43, 43 are connected to one another at their central positions by means of a laterally extending cross member 45 connected thereto by some suitable means. Also, the front and rear distal ends of the side frame components 43, 43 are connected to one another by means of a plurality of laterally extending front and rear wire frame components 47, 47 at locations corresponding to a seating position of the seat cushion 12.

A plurality of laterally spaced, longitudinally extending wire frame components 49, 49 are secured at front ends to the laterally extending rear wire frame component 47 and secured at rear ends to the rear movable rail 33 to allow a pad material (not shown) to be encapsulated. Further, a trim wire 51 is connected to the seat frame 41 around a circumferential periphery thereof.

With the above mentioned structure, by manipulating the operating lever 28, the right and left fore and aft slide units 21, 21 allows the seat cushion 12 to be longitudinally moved from one current longitudinally locked position to another desired longitudinally locked position. Similarly, by manipulating the operating lever 37, the front and rear lateral slide units 31, 31 allows the seat cushion 12 to be laterally moved from one current laterally locked position to another desired laterally locked position.

Incidentally, the present invention is not limited to the particular structure of the present embodiment described above, and various other suitable changes or variations may be freely made to shapes and structures of various component parts of the fore and aft slide units 21, 21 and the lateral slide units 31, 31 in conjunction with the shapes or materials of the respective rails.

In the present invention, an important advantage of the vehicle seat assembly typically concerns the seat frame constructed of laterally spaced side frame components and the front and rear frame components. The front and rear frame components are composed of the front and rear movable rails of the longitudinally spaced front and rear lateral slide units which are supported with the laterally spaced fore and aft slide units fixedly secured to the floor panel of the vehicle body. Such a specific structure enables the height of the seat cushion to be maintained at a lower value without sacrificing an occupying area of the floor panel of the vehicle body. In addition, there is less fear where, even when the vehicle seat is moved to its extreme sliding positions, the lateral slide units are not exposed below the seat cushion. Even in a case where the floor panel of the vehicle body has stepped portions due to wheel houses, etc., the vehicle seat assembly of the invention can be easily installed to the floor panel. Thus, it is possible for the vehicle seat assembly to reduce the weight and manufacturing cost.

The entire content of a Patent Application No. TOKUGAN 2001-24138 with a filing date of Jan. 31, 2001 in Japan is hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A vehicle seat assembly comprising:
a seat frame supporting a seat cushion and provided with side frame components laterally spaced to each other;
a pair of lateral slide units longitudinally spaced to each other and coupled to the seat frame for lateral sliding movement of the seat cushion; and
a pair of longitudinal slide units laterally spaced to each other and adapted to be fixedly secured to a floor panel of a vehicle body for longitudinal sliding movement of the seat cushion, the lateral slide units being coupled to the longitudinal slide units,
wherein the lateral slide units include front and rear stationary rails, which are longitudinally spaced to each other and supported with the longitudinal slide units, and front and rear movable rails, which are longitudinally spaced to each other and held in engagement with the stationary rails for the lateral sliding movement of the seat cushion, respectively, and the front and rear movable rails of the lateral slide units are fixedly secured to concave portions of front and rear ends of the side frame components, respectively, to form the seat frame.

2. A vehicle seat assembly according to claim 1, wherein the longitudinal slide units include a pair of lower rails, which are laterally spaced to each other and fixedly secured to the floor panel of the vehicle body in a longitudinal direction, and a pair of upper rails, which are laterally spaced to each other and guided by and supported with the lower rails in the longitudinal direction for the longitudinal sliding movement of the seat cushion, respectively.

3. A vehicle seat assembly according to claim 2, wherein the front and rear stationary rails of the lateral slide units are fixedly secured to front and rear ends of the upper rails of the longitudinal slide units, and the front and rear movable rails of the lateral slide units engage with the front and rear stationary rails for the lateral sliding movement of the seat cushion, respectively.

4. A vehicle seat assembly according to claim 2, wherein each of the lower rails of the longitudinal slide units includes a body portion having a substantially upwardly facing C-channeled configuration and a pair of upper side portions extending inward from upper distal ends of side walls of the body portion to form an opening portion.

5. A vehicle seat assembly according to claim 4, wherein each of the upper rails of the longitudinal slide units includes a body portion guided by and supported with one of the lower rails of the longitudinal slide units and a vertical wall extending upward from the body portion away from the opening portion of the corresponding one of the lower rails and coupled to each of the stationary rails of the lateral slide units.

6. A vehicle seat assembly according to claim 1, wherein each of the front and rear movable rails of the lateral slide units includes a body portion having a substantially downwardly facing C-channeled configuration and a pair of front and rear lower end portions extending inward from lower distal ends of side walls of the body portion to form an opening portion from which one of the front and rear stationary rails of the lateral slide units extends downward.

7. A vehicle seat assembly according to claim 6, wherein at least the rear stationary rail of the lateral slide units has a substantially T-shaped configuration such that the rear movable rail of the lateral slide units moves through the opening portion and the rear stationary rail is coupled to the upper rails of each of the longitudinal slide units.

* * * * *